US006944782B2

(12) United States Patent
von Mueller et al.

(10) Patent No.: US 6,944,782 B2
(45) Date of Patent: Sep. 13, 2005

(54) MAGNETIC STRIP READER WITH POWER MANAGEMENT CONTROL FOR ATTACHMENT TO A PDA DEVICE

(75) Inventors: Clay von Mueller, San Diego, CA (US); Robert J. Mos, San Diego, CA (US)

(73) Assignee: Semtek Innovative Solutions, Inc., San Diego, CA (US)

( * ) Notice: Subject to any disclaimer, the term of this patent is extended or adjusted under 35 U.S.C. 154(b) by 634 days.

(21) Appl. No.: 10/074,086

(22) Filed: Feb. 12, 2002

(65) Prior Publication Data

US 2003/0154414 A1 Aug. 14, 2003

(51) Int. Cl.$^7$ .............................. G06F 1/32; H04M 1/00; G06K 5/00
(52) U.S. Cl. ...................... 713/320; 713/300; 235/380; 235/449; 455/556.1
(58) Field of Search .............................. 455/556.1, 574; 713/300, 320; 235/380, 449; 710/73, 302

(56) References Cited

U.S. PATENT DOCUMENTS

| | | | | | |
|---|---|---|---|---|---|
| 4,028,734 A | * | 6/1977 | Mos | ........................... | 360/240 |
| 5,579,487 A | * | 11/1996 | Meyerson et al. | .......... | 710/100 |
| 5,603,078 A | * | 2/1997 | Henderson et al. | ............ | 725/6 |
| 5,625,534 A | * | 4/1997 | Okaya et al. | ............... | 361/686 |
| 5,664,231 A | * | 9/1997 | Postman et al. | ............... | 710/73 |
| 6,065,880 A | * | 5/2000 | Thompson | .................... | 385/88 |
| 6,234,389 B1 | * | 5/2001 | Valliani et al. | ............. | 235/380 |
| 6,308,233 B1 | * | 10/2001 | Park | .......................... | 710/302 |
| 6,334,575 B1 | * | 1/2002 | Su-Hui | ........................ | 235/492 |
| 6,434,652 B1 | * | 8/2002 | Bailis et al. | ................. | 710/302 |
| 6,536,670 B1 | * | 3/2003 | Postman et al. | ............ | 235/487 |
| 2002/0134837 A1 | * | 9/2002 | Kishon | ........................ | 235/449 |
| 2002/0169913 A1 | * | 11/2002 | Heizer et al. | ............... | 710/302 |

FOREIGN PATENT DOCUMENTS

WO WO 03/065227 A1 * 8/2003

* cited by examiner

Primary Examiner—Chun Cao
(74) Attorney, Agent, or Firm—Richard D. Clarke

(57) ABSTRACT

A magnetic stripe card manual swipe reader (MSR) unit capable of attaching to and communicating with a conventional personal digital assistant (PDA) from various manufacturers, using only the electrical power available as supplied by the PDA device, and capable of effective electrical power management and conservation operations. Additionally, this PDA attachable MSR unit is capable of recognizing multiple magnetic encoding formats and data record formats and converting said formats to a standardized output format, includes the capability of updating and adding new formats while in field service, and is readily allows verifying card data and encoding sensitive material prior to transmission to the PDA. These custom formats can then be used to fulfill current needs in age verification, law enforcement, security, and numerous other applications.

29 Claims, 8 Drawing Sheets

MAGNETIC STRIP READER WITH POWER MANAGEMENT CONTROL FOR ATTACHMENT TO A PDA DEVICE

BACKGROUND OF THE INVENTION

1. Field of the Invention

The present invention relates to a magnetic stripe reader for attachment to a handheld personal digital assistant (PDA), including novel power management features, and a method of making same. More particularly, the present invention relates to a magnetic stripe reader attachable to a handheld PDA which enables the reading and writing of information on a single or multiple track magnetic stripe. The novel power management features allows the device to operate without the extra batteries and interface units required by other designs. In addition, this novel magnetic stripe reader can utilize a user changeable module, which allows for custom magnetic stripe formats to be implemented and updated, including United States (US) state drivers licenses. These custom formats can then be used to fulfill current needs in age verification, law enforcement, security, and numerous other applications.

2. Description of the Related Art

Cards which have a magnetic stripe attached thereto are ubiquitous in modern society today. That is, nearly everyone carries one of the following cards, each of which typically have a magnetic stripe attached thereto: credit cards, bank cards (ATM cards), debit cards, identification cards, drivers licenses, security access cards, check cashing cards, etc.

The necessity and usefulness of devices which decode the information on such cards are well known. Examples of another type and kind of device for decoding information on magnetic strips is disclosed in U.S. Pat. No. 4,028,734.

The need to read and decode and save the information on such cards using low cost and portable PDA's has become increasingly evident in recent months. One such application is in reading the custom formats used in US state drivers licenses. To date forged drivers licenses used to purchase alcohol and tobacco do not contain correctly encoded data on the attached magnetic stripe. The described invention can be used to read the 25 various formats in use by US state departments of motor vehicles and display the physical description recorded on the magnetic stripe. Liquor stores, bars, and law enforcement agencies can use this portable system to determine the authenticity of the identification cards being used to purchase controlled substances.

One unit capable of providing these functions is made by Symbol. Due to the high complexity, high component costs, and short battery life associated with this type of unit, it is of limited practical value in practice and everyday use.

SUMMARY OF THE INVENTION

Therefore, the principal object of the present invention is to provide a new and improved magnetic stripe reader, which interfaces, to low cost PDA's such as the Palm III, TRGPRO and Handera 330. These small, portable devices are typically powered by AAA batteries, which have a very limited useful battery life. To ensure that devices connected to these PDA's serial port do not drain the batteries too quickly, all of the connections to external devices are electrical current limited. The power available for external devices is 2.5V at 1 MA. Current serial port magnetic stripe readers (MSR's) require 5V at 10 MA to operate correctly. The present invention uses several novel power management design features to lower the power required to less than 1 MA at 2.5V.

It is a further object of the present invention to provide additional power savings and ease of operation by controlling the PDA. The battery life of the PDA is severely limited if the unit is powered on or if the serial port is enabled. The current invention monitors the MSR in a very low current mode, at less than 100 uA until a card is swiped. The PDA is then turned on, but just long enough to record and display the data before being automatically turned off again. In this way electrical output power is conserved and no additional power switch is required.

It is yet another object of the present invention to provide the MSR with a removable processor/memory module to facilitate user upgrades and data logging capabilities. Most PDA's lose their program and data information if the batteries are drained or removed. The removable processor/memory module incorporated into the MSR sled (expand on sled) allows for programs and data used and stored by the MSR to be retained in the event that the PDA batteries are drained or removed. Updates to programs used by the PDA along with new data formats can be installed in the field with no technical experience. In addition, data read from the cards can be stored for later retrieval by the PDA or removed from the sled and read by a conventional personal computer (PC).

It is yet a further object of the present invention to allow the replacement of the processor/memory module to facilitate applications or needs that are beyond the capabilities of the internal processor. In one embodiment, the processor controlling the MSR can get new programming instructions from the processor/memory module, and in another embodiment, the processor/memory module contains the processor controlling the MSR. In the later embodiment, if a new function such as DES encryption requires the processor to be changed, the user in the field can readily accomplish the change. In addition, the processor/memory module can be used to incorporate new functions in addition to reading magnetic stripes, such as, for example, reading bar codes, etc.

It is yet a further object of the present invention to allow the addition of a processor/memory module to facilitate secure token verification remotely to the PDA processor.

It is yet another object of the present invention to provide a wireless PDA with the capability to process credit card transactions. PDA's such as the Palm VII allow Internet and cell phone based communications. With the inclusion of a MSR card swipe, credit card transactions can be supported.

It is yet a further object of the present invention to provide a wireless personal identification number or PIN pad for ATB debit transactions. By using the infrared or IR port provided in all PDA's a small wireless PIN pad can be used to transmit the customers PIN number to the PDA. The PIN pad incorporates encryption technology to allow for secure transmission of the PIN data to the PDA.

It is yet a further object of the present invention to provide for hot syncing with a PC while the MSR sled is attached to the PDA. Other devices attached to a PDA must be physically removed or disabled with mechanical switches before the PDA can be attached to the hot syncing cradle. The present invention allows for cradle hot syncing without being removed or manually disabled. Not only does this add user convenience, it also allows data and programs in the processor/memory module to be read and updated through the hot sync cradle.

Briefly, the above and further objects of the present invention are realized by providing a new and improved magnetic stripe card manual swipe reader (MSR) unit capable of attaching to and communicating with a conventional personal digital assistant (PDA) from various manufacturers, using only the electrical power available as supplied by the PDA device, and capable of effective electrical power management and conservation operations. Additionally, this PDA attachable MSR unit is capable of recognizing multiple magnetic encoding formats and data record formats and converting said formats to a standardized output format, includes the capability of updating and adding new formats while in field service, and is readily allows verifying card data and encoding sensitive material prior to transmission to the PDA. These custom formats can then be used to fulfill current needs in age verification, law enforcement, security, and numerous other applications.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

DESCRIPTION OF THE PREFERRED EMBODIMENTS

Figure 1:
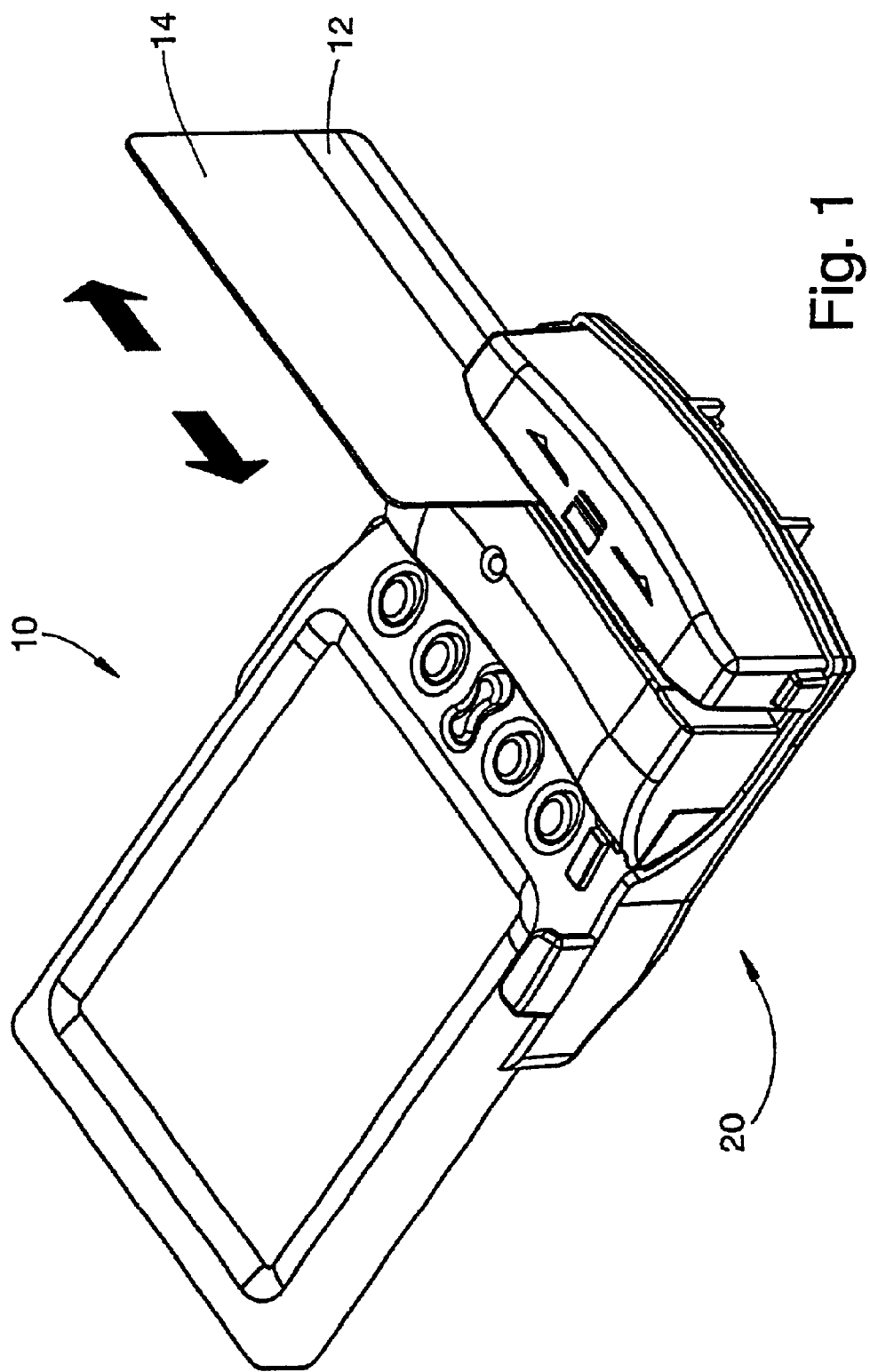
FIG. 1 is a PDA including an attached manual magnetic stripe card reader, showing the motion (arrows) of swiping said magnetic stripe card, constructed in accordance with the present invention.

Referring first to FIG. 1, a typical personal digital assistant ("PDA") 10 is shown including an attached manual magnetic stripe card reader 20 constructed in accordance with a first embodiment of the present invention. In general, a PDA is defined as any type of handheld device that combines computing, wireless communication, and networking features, and that includes a data display, a synchronization port, and the capability to exchange data with a personal computer by means of a so-called hot sync function. A PDA is generally provided with a detachable PDA cradle that not only functions as a resting place for the PDA, but that also enables the PDA to hot sync with a personal computer through the synchronization port of the PDA and through suitable connectors in the PDA cradle. The magnetic stripe reader ("MSR") 20 attachable to the PDA 10 includes novel PDA electrical power source management functions, and functions to read the magnetic stripe 12 located on typical cards 14 such as credit cards, driver licenses, etc. In operation, when the card reader or MSR 20 is attached to the PDA, the magnetic stripe card 14 can be swiped in either direction (as shown by arrows) to read and decode the data and information stored on the magnetic stripe 12, and send it to the PDA 10 for processing.

Figure 2:
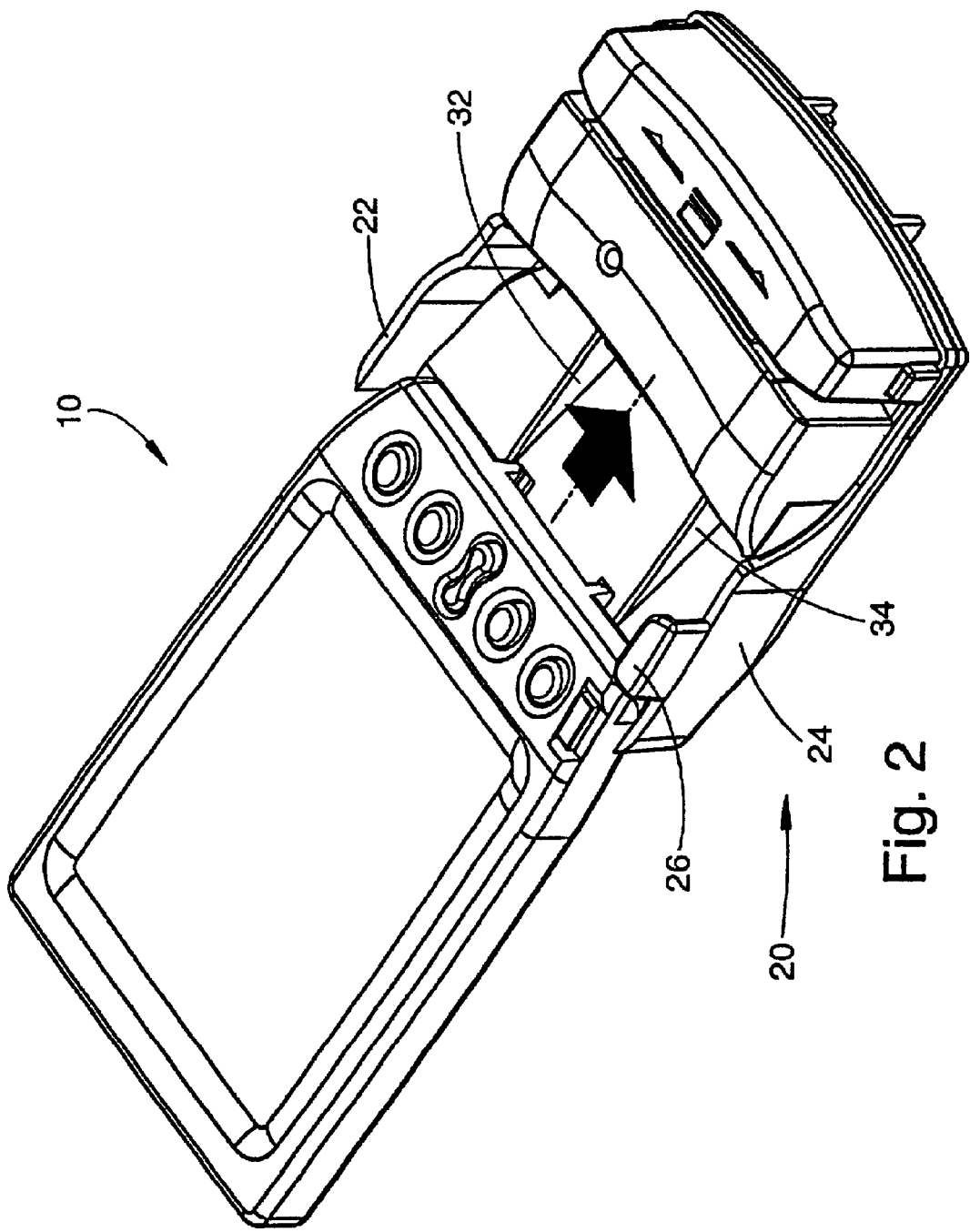
FIG. 2 is a PDA including an attached manual magnetic stripe card reader, showing the motion (arrow) of attachment to, and detachment from the PDA, of said magnetic stripe card reader, constructed in accordance with the present invention.

Referring now to FIG. 2, again here is illustrated a typical PDA 10 with the attachable manual magnetic stripe card reader 20 only partially connected. This figure clearly shows how the attachable manual magnetic stripe card reader 20 constructed in accordance with the present invention is readily attached and detached from the typical PDA 10. An arrow indicates the direction in which the attachable manual magnetic stripe card reader 20 is mounted onto a PDA 10. The attachable manual magnetic stripe card reader unit 20 slides into place guided by integrally formed side members 22 and 24, and when fully mounted, is held securely to the PDA by retaining tab 26. In addition, slide guides 32 and 34, molded into the lower portion of the attachable manual magnetic stripe card reader 20 unit, act to guide the PDA 10 properly into place and secure it there while the attachable manual magnetic stripe card reader 20 is fully mounted for use. Electric power is transferred from the PDA 10 to the MSR 20 through the PDA synchronization port, and data is also exchanged between the MSR 20 and the PDA 10 through the PDA synchronization port. In the illustrated embodiment, the MSR 20 is provided with a housing that is shaped like a cradle retaining at least a portion of the PDA 10 and fitting between the PDA 10 and the PDA cradle. Said housing comprises a first connector connected to the PDA synchronization port and a second connector connected to the PDA cradle, so that the PDA 10 can maintain hot sync capabilities with a personal computer even when the MSR 20 is interposed between the PDA 10 and the PDA cradle. A wireless personal identification number pad ("PIN pad") may be connected to the MSR 20, enabling a user to enter a personal identification number to complete a transaction. In a different embodiment, the PIN pad is not a component that is separate from the MSR 20, but is built instead into the housing of the MSR 20, becoming an integral part thereof.

Figure 3:
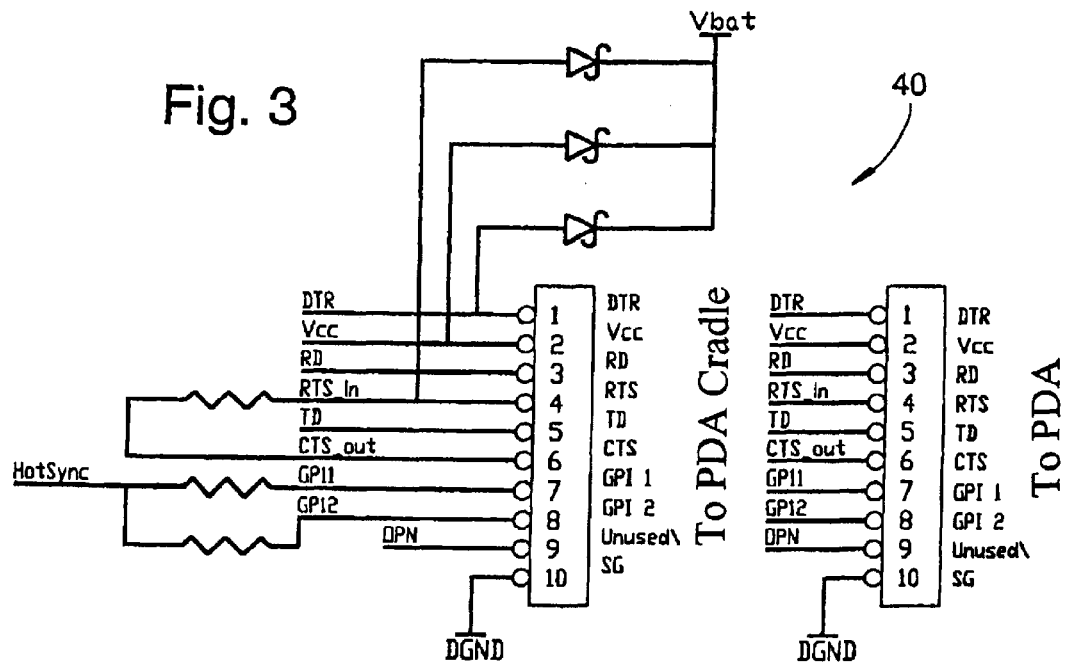
FIG. 3 is a schematic representation of a PDA cradle port interface and power routing diagram.

Referring now to FIG. 3, a schematic diagram 40 is shown detailing the interfaces between the MSR 20, the PDA 10, and the PDA cradle. In describing this embodiment, reference will be made to a serial port, although other types of synchronous ports may be employed. Depending on the particular PDA being used and its existing state of operation, electrical power may be available at any one of a number of pins. In addition to the various locations of the power source, each pin is limited to the amount of current it can supply. The method of current limitation employed in most typical PDA's takes the form of a 300 ohm in series resistor. The most notable departure from this convention is the HandEra 330, which uses 440 ohm limiting resistors. Either the Vcc or DTR pin supplies 3V when the unit is off depending on the PDA model. When the PDA is powered on some models do not change the status of any pin others set both the Vcc and DTR pin to 3V. When the serial communications port is enabled by the PDA, the DTR and RTS pins are set to between 5V and 7V, depending upon the unit and the battery voltage. These voltages are with no current being drawn from the pin. Both the Vcc and DTR pins can supply approximately 2 mA at 2V with the unit off. With the PDA powered on the available voltage and current increases slightly. To cope with all of these possible power limitations three Schottky diodes are used to route trickle charge voltage to a temporary storage device. These diodes are used to prevent different supply voltages within the PDA from being connected together causing increased current drain and possible adverse operation effects. In this embodiment, the storage device is a large value capacitor made from placing 6 smaller capacitors in parallel. In another embodiment, the Schottky diodes are replaced with low voltage drop transistors. In an alternate embodiment, when the selection of PDA's is limited the diodes are replaced with direct connections. In either embodiment, the MSR may be designed to operate with a maximum power consumption of 2 mA while reading and decoding data, and of 300 µA in an idle state.

Figure 4:
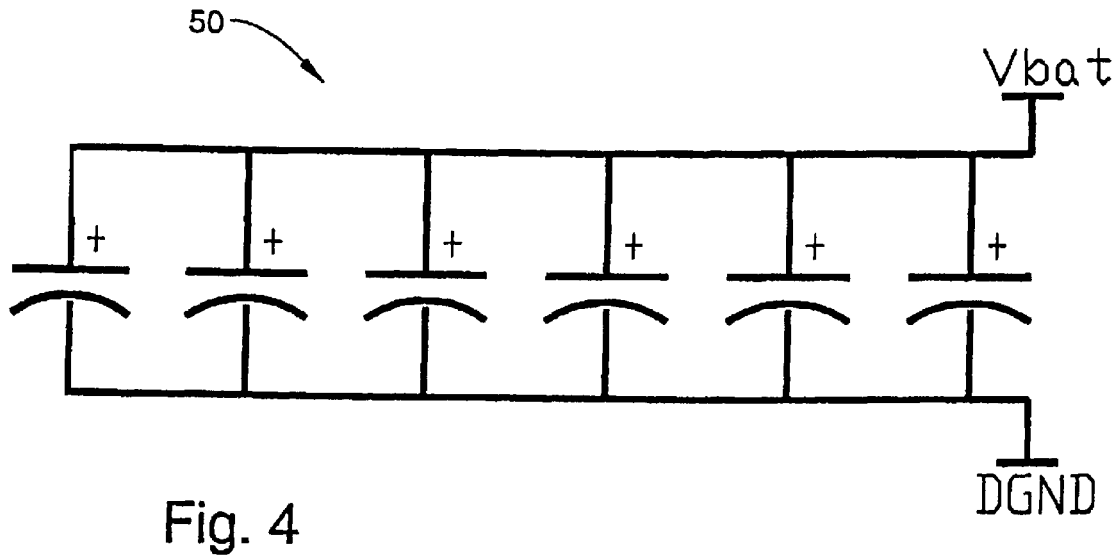
FIG. 4 is a schematic representation of a power storage device.

Referring to FIG. 4, here a temporary power storage device schematic 50 is shown. The temporary power storage device is routinely trickle charged up to the Vcc or DTR pin voltage. When fully charged only a small leakage current of a few micro-amperes is present. In the described embodiment, less than one second is required to charge the device. The storage device is then fully ready to provide operational current for operation.

Figure 5:
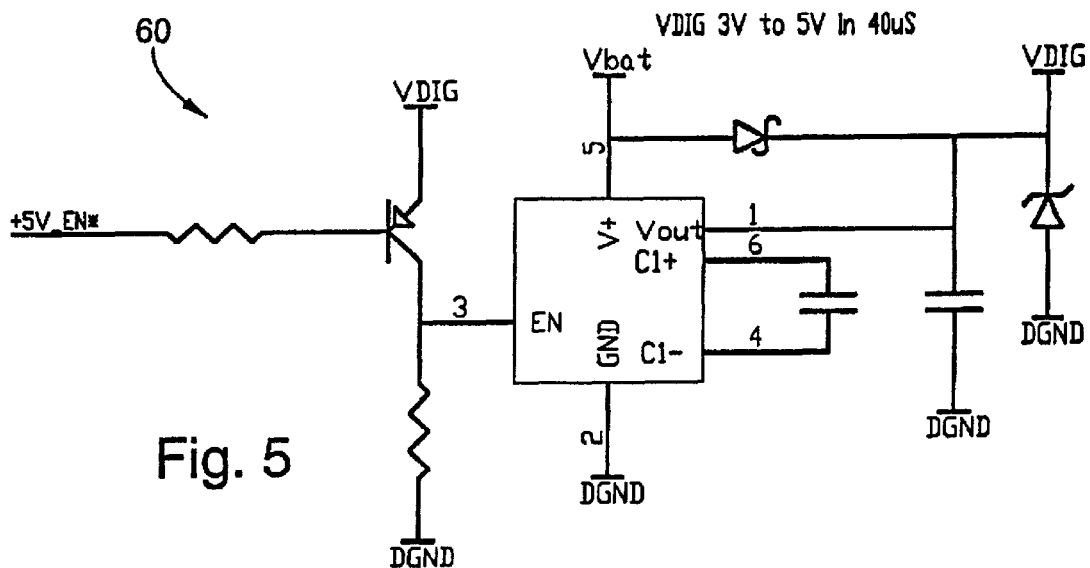
FIG. 5 is a schematic representation of a 3V to 5V power converter.
Figure 10:
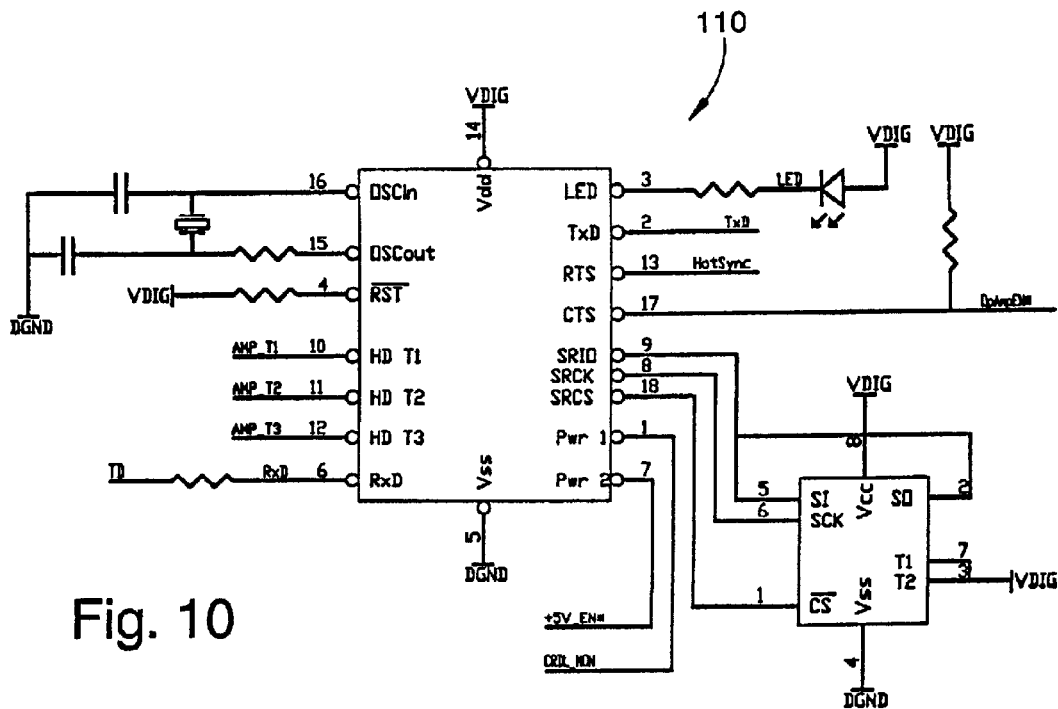
FIG. 10 is a schematic representation of a microcontroller and serial memory device.

Referring now to FIG. 5, a 3V to 5V power converter schematic diagram 60 is illustrated. During a card read operation some of the circuit components require 5V to function properly. During low power operation 3V is sufficient to operate the required circuit subset. A regulated charge pump converter is used to generate the 5V from the 3V source supplied by the power storage device. A Schottky diode is used to bypass the charge pumps supply input voltage to output to supply approximately 3V to VDIG when the +5V$_{13}$ EN* is disabled. The micro-controller/microprocessor as shown in FIG. 10 (see below) enables the charge pump under software control. When enabled the processor Vcc is also switched from 3V to 5V. In an alternate embodiment, the processor and memory are always run at 3V and only the RS232 output devices are run at 5V. This novel design is able to switch between the 3V and 5V states in 40 micro-seconds which is required to accept the card data.

Figure 6:
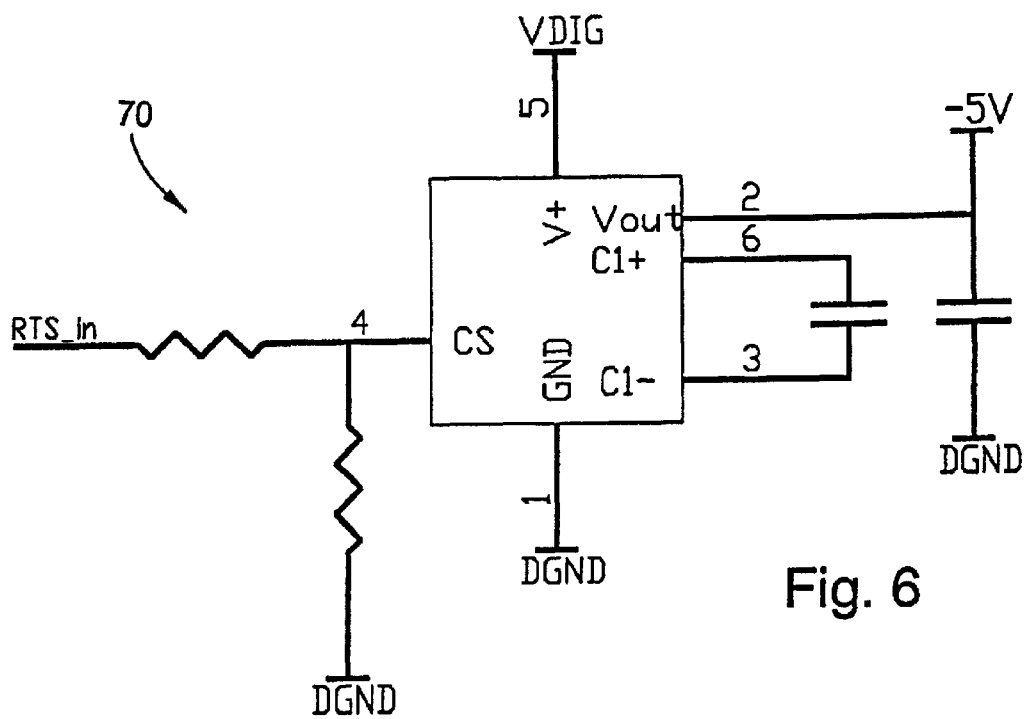
FIG. 6 is a schematic representation of a RS232 negative supply converter.

Referring to FIG. 6, an RS232 negative supply converter schematic diagram 70 is shown. Typical PDA's do not operate as conventional RS232 serial devices. Due to high current consumption by the serial port when active, they are disabled when not being used. The negative voltage generator for RS232 compatibility must be a greater (or more) negative than minus 4 volts. An inverting charge pump is used to supply the negative supply voltage. It is disabled until the RTS input RS232 signal is set true by the PDA. In this way, current is used by the RS232 drivers only when the PDA has enabled its serial port.

Figure 7:
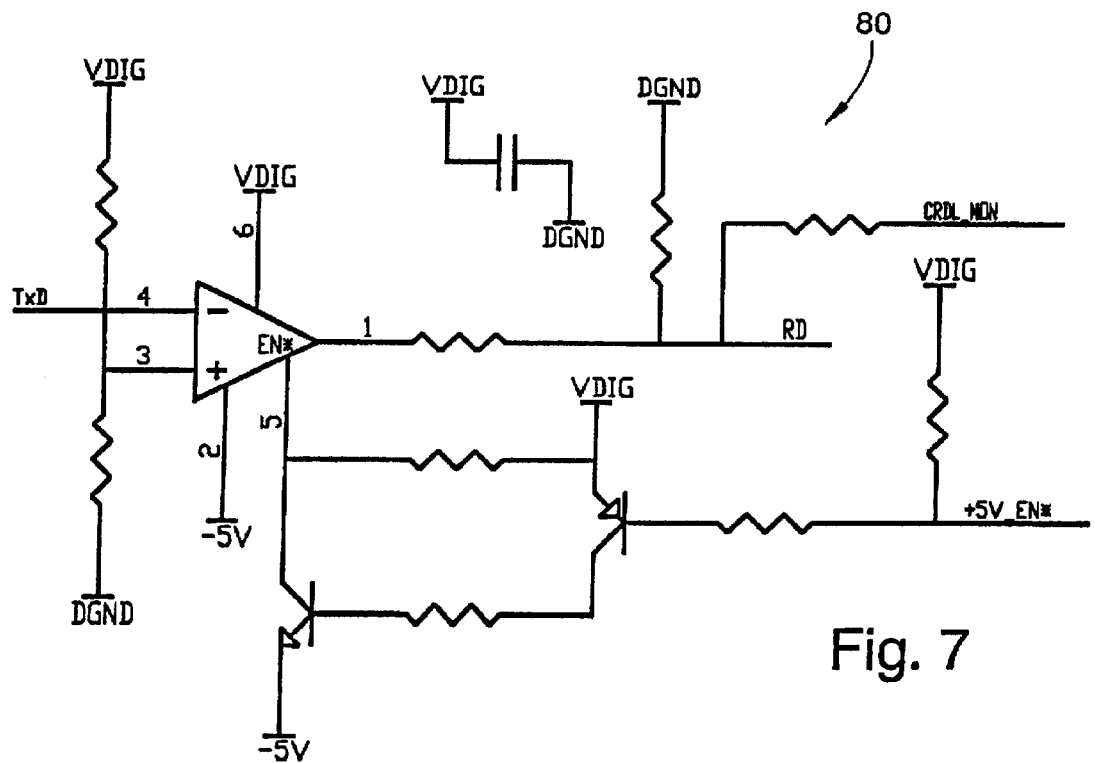
FIG. 7 is a schematic representation of a RS232 output driver and Hot Sync Cradle monitor.

Referring to FIG. 7, here an RS232 output driver and Hot Sync Cradle monitor schematic diagram 80 is illustrated. When the PDA with the described MSR is placed into a hot sync cradle the MSR most allow for normal serial communications between the PC and the PDA. The +5V_EN* signal from the micro-controller is able to disable the MSR for these functions. In the current embodiment, the CRDL_MON signal is monitored by the MSR micro-controller prior to any card swipe operation. If the unit is connected to a PC, the RD signal will be at a minus voltage. If the unit is not in the cradle or if the serial port is disabled the RD signal will be at the VDIG level. The micro-controller uses the voltage level of the RD pin to determine if it is busy or available to be used by the MSR to transmit data to the PDA.

Figure 8:
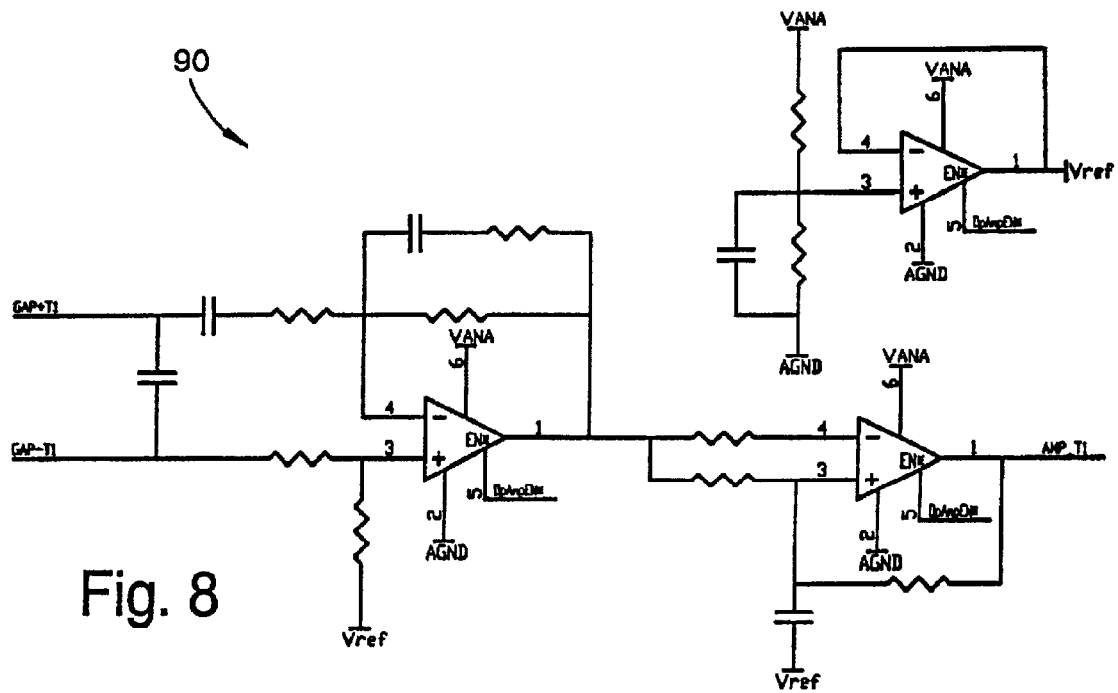
FIG. 8 is a schematic representation of a fast turn-on dual peak detector and magnetic head amplifier.

Referring to FIG. 8, a fast turn-on dual peak detector and a magnetic head amplifier schematic diagram 90, constructed in accordance with the present invention, is shown. The fast turn-on dual peak detector and a magnetic head amplifier is required to reduce the power consumption to acceptable levels. With the track density used on tracks one and three in standard magnetic stripe data, the circuits required to amplify and detect the magnetic data requires more than 1MA per track. These circuits need only to be active and stable during the time that the card is in contact with the head. At a normal card swipe speed of 10 inches per second, the circuits need to be active for only about 100 milliseconds. Once the card is detected, the circuits must become active and stable within 10 milliseconds. The first operational amplifier amplifies and differentiates the signal from the inductive read head. The second operational amplifier is used as a comparator to output a signal that is compatible with the micro-controller. A third operational amplifier is used to stabilize the reference supply for fast turn on.

Figure 9:
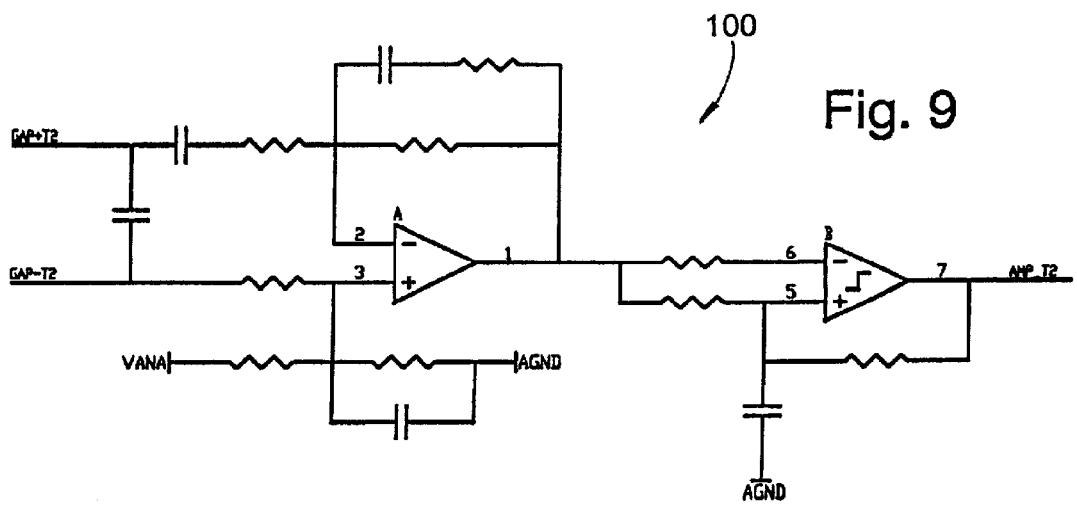
FIG. 9 is a schematic representation of a micro-power dual peak detector and magnetic head amplifier.

Referring now to FIG. 9, a micro-power dual peak detector and magnetic head amplifier schematic diagram 100, constructed in accordance with the present invention, is shown. The lower data density of track two data allows for the use a very low power head amplifier and dual peak detector. This circuit is always operational. Whenever a card swipe is initiated, the output of this circuit starts and signals the micro-controller. Since all cards of interest have data on this track, this signal is always available to start the MSR operation, avoiding the need for a mechanical power switch, and allowing the MSR to consume power only when required. In this way, PDA electrical power source is properly managed and efficiently conserved, when the attachable card reader is mounted into place on the PDA being used to swipe and read data contained on magnetic stripe containing cards.

Referring to FIG. 10, a micro-controller/microprocessor and serial memory device schematic diagram 110, constructed in accordance with the present invention, is shown. This processor/memory module and controls the operation of the MSR. The serial memory device stores card data during the read and decode process. It can also be used to track format information along with data from previous cards read. The serial memory device maybe a single circuit, or multiple circuits to increase the storage size. It may also be removable from the MSR for data logging applications. AMP$_{13}$ T1, AMP_T2, and AMP_T3 are the outputs of the respective head amplifiers and peak detectors. The Manchester encoded data on the magnetic stripe is first converted into binary, then into one of multiple secondary formats, by the micro-controller. ISO 7811 describes two formats one being a 6 bit with a parity bit uppercase alpha-numeric, and the other being a 4 bit with a parity bit numeric. Some US driver licenses and identification cards use a 6 bit no parity uppercase alpha-numeric. In each case, multiple formats are available for decoding the track data by the micro-controller. In addition to various data bit formats, each US state driver licenses and identification cards has one or more different data formats for the card information. The serial memory can contain a table of information such as the location of age and physical information for each state. The MSR can detect the state of issuance and then parse the desired data, such as age, prior to sending the information to the PDA. In this way, the PDA application does not need to understand and maintain information on how each of the 50 states formats their driver licenses or identification card data. Moreover, these format tables can also be used in other applications, such as the medical field, to convert multiple card data formats between different patient identity cards to one standard format used by the PDA application. Further, the processor/memory module maybe capable of unloading software that can be installed in the field, such as software that is specific for age verification, or of being programmed to verify the authenticity of the magnetic stripe data before such data is sent to the PDA. Also, the processor/module may be capable of encrypting the data exchanged with the PDA prior to storing such data in the PDA and prior to transmitting such data to a processing agency, so that a PDA operator is unable to read any sensitive data stored on the magnetic stripe. When the MSR comprises a PIN pad, the transmission to the PDA of the any personal identification numbers digitized into the PIN pad may be prevented.

In a different embodiment, a second removable processor/module module may be present, that can be inserted in a corresponding external slot in the MSR and that is capable of storing different data formats and software.

Figure 11:
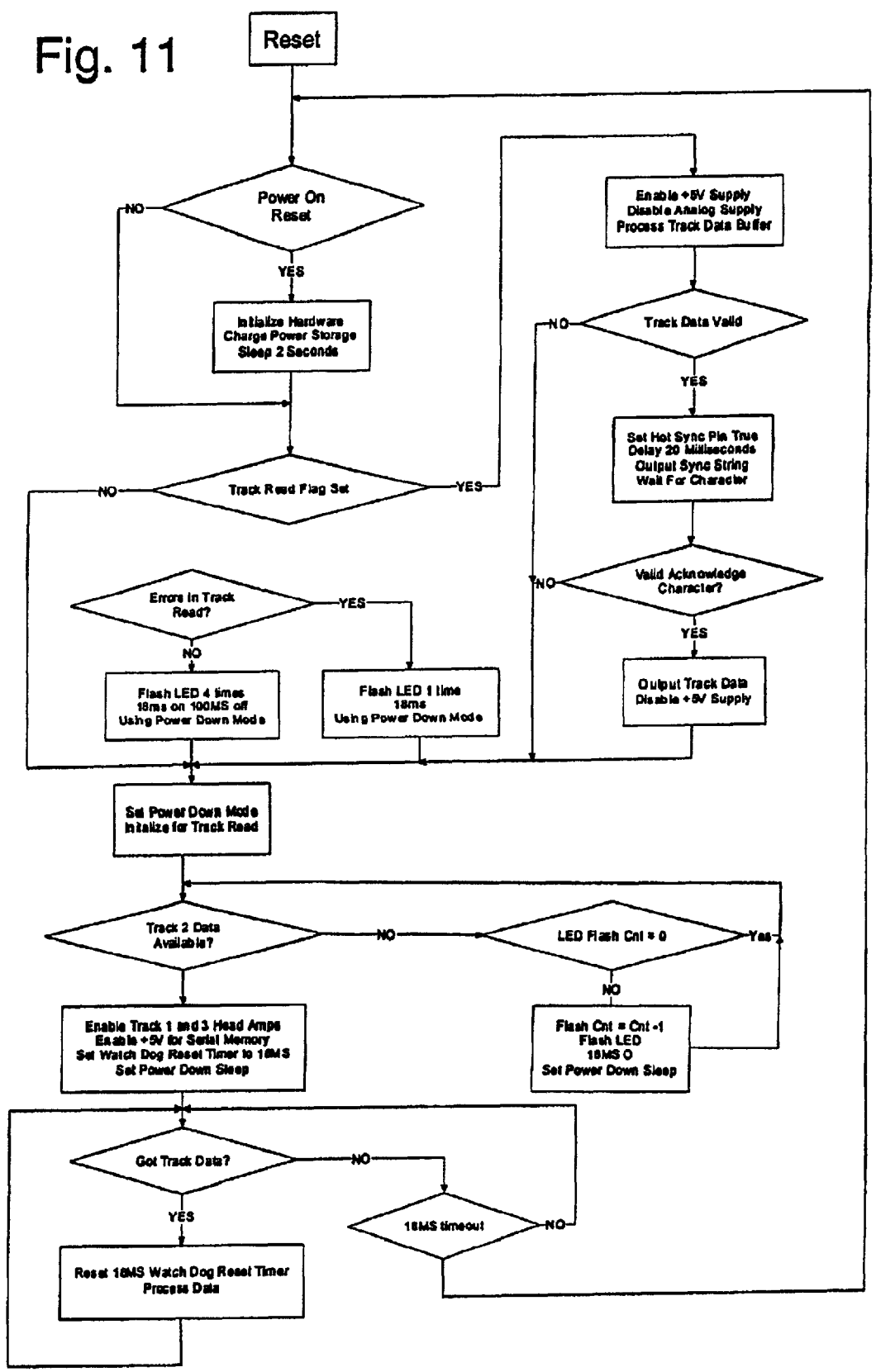
FIG. 11 is a flow chart illustrating the power management operation of an attached manual magnetic stripe card reader, in accordance with the present invention.

Referring now to FIG. 11 a flow chart of the PDA power management operation is shown. By applying this power management and conservation program to the PDA when the attachable manual magnetic stripe card reader is mounted, numerous read and other operations are possible without undue power consumption. Therefore, not only does the present invention allow a conventional PDA to read information stored on magnetic stripe cards and other means of storage, it also facilitates those information read and information transfers by enabling PDA power consumption to be curtailed, PDA power to be conserved, and PDA power to be effectively managed. In this way many more card read applications and operations are possible using the existing conventional PDA power source.

Figure 12:
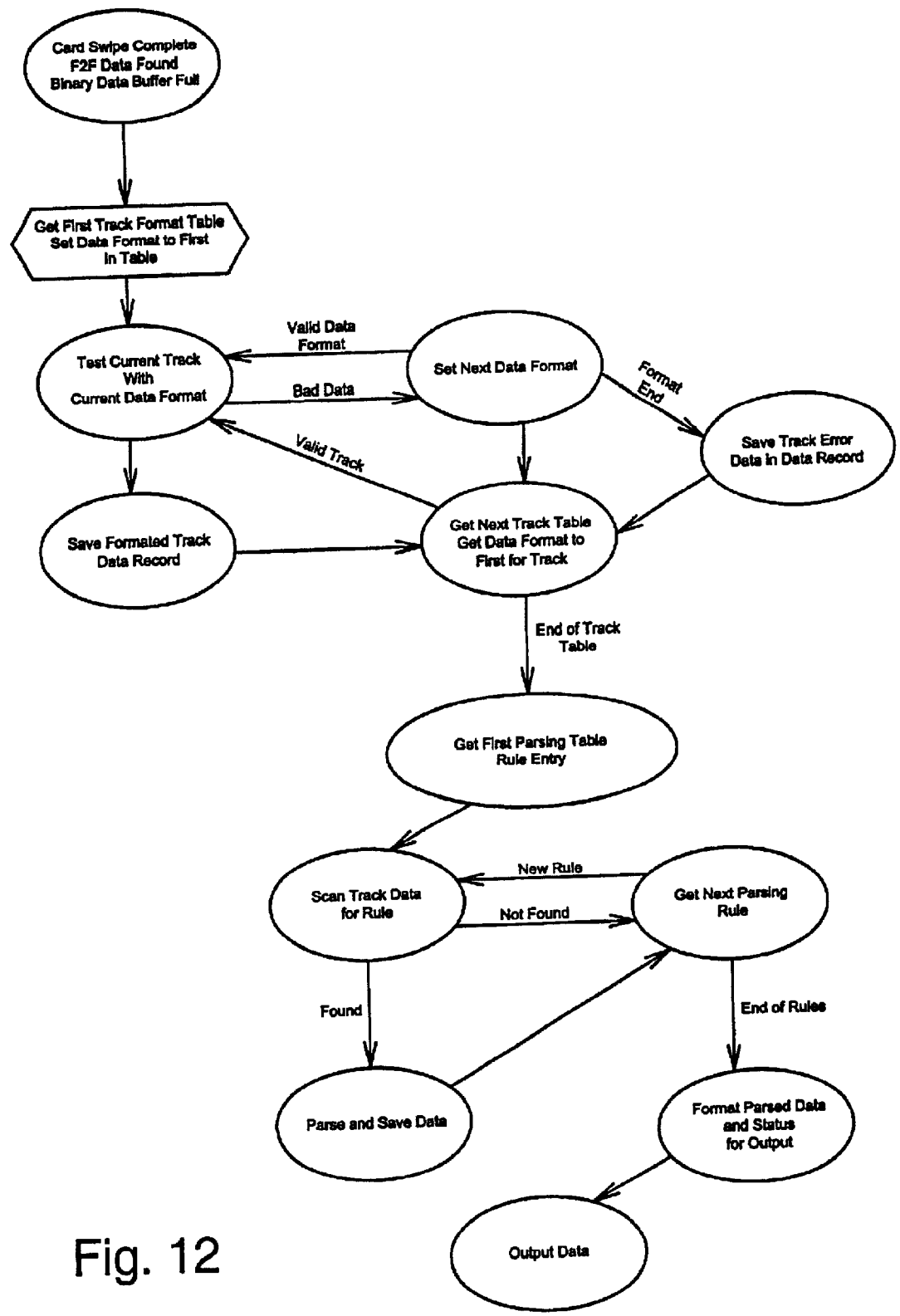
FIG. 12 is a flow chart illustrating the software operation for multiple data formats, of an attached manual magnetic stripe card reader, in accordance with the present invention.

Referring finally to FIG. 12 a flow chart of the software operation for multiple data formats is shown. The MSR is in a low power down mode until track two data causes the micro-controller to initiate a read operation. The F2F Manchester encoded data for all tracks is read and stored. The read operation is considered complete when no new F2F input is received within 18 ms. The stored data is then read and converted to a binary format and stored. Each track of binary data is then processed with each successive entry in the track format table until a no error condition or the table end is encountered. The formatted data or an error condition is stored for the track and the next track is processed. After all tracks are processed using the data format table the optional parsing table is used to parse data to specific applications. One such application is for age verification. In this application, the parsing consists of US state driver license and ID card parsing rules. These rules select the state of issuance of the identification card, and then the data fields specific to the applications needs, such as birth date and physical characteristics. This data is then formatted in one or more standard output formats and sent to the PDA. The output format table can also be used to encode any sensitive data prior to transmission.

It should be understood, however, that even though these numerous characteristics and advantages of the invention have been set forth in the foregoing description, together with details of the structure and function of the invention, the disclosure is illustrative only, and changes may be made in detail, especially in matters of shape, size, construction, materials, interactivity and arrangement of parts within the principal of the invention to the full extent indicated by the broad general meaning of the terms in which the appended claims are expressed.

What is claimed is:

1. A magnetic stripe reader ("MSR") attachable to a personal digital assistant ("PDA"), the PDA having a data display, a synchronization port and hot sync capabilities, the MSR comprising:
    (a) means for reading and decoding data on a magnetic stripe;
    (b) means for transferring electric power from the PDA to the MSR and for exchanging data between the MSR and the PDA through the PDA synchronization port; and
    (c) means for managing electrical power consumption that control an automatic startup of the PDA and of the means for reading and decoding data on a magnetic stripe upon detecting encoded data on the magnetic stripe.

2. The magnetic stripe reader according to claim 1, wherein said means for managing electrical power consumption comprise the automatic startup of the PDA upon detecting encoded data on the magnetic stripe by simulating a hot sync of the PDA.

3. The magnetic stripe reader according to claim 2, wherein said automatic startup of the PDA upon detecting encoded data on the magnetic stripe is accomplished by replacing the PDA's hot sync driver with a driver that differentiates between the hot sync and said means for reading and decoding data on a magnetic stripe, and thereby said driver sets the PDA to operate accordingly.

4. The magnetic stripe reader according to claim 1, wherein said means for reading and decoding data on a magnetic stripe include a removable processor/memory module.

5. The magnetic stripe reader according to claim 4, further comprising a second removable processor/memory module inserted in a corresponding external slot in the magnetic stripe reader, the second programmable/processor module being capable of storing different data formats and software.

6. The magnetic stripe reader according to claim 4, wherein said processor/memory module is capable of storing multiple data format specifications and of converting varied magnetic stripe data formats into a standardized single format for data logging and outputting to the PDA.

7. The magnetic stripe reader according to claim 6, wherein said processor/memory module is capable of reading the different decoding formats utilized on driver licenses and on other state-issued documents, enabling the display on the PDA of age and physical attributes in a single standardized output.

8. The magnetic stripe reader according to claim 6, wherein said processor/memory module is capable of preventing transmission to the PDA of predetermined types of data encoded on the magnetic stripe.

9. The magnetic stripe reader according to claim 4, wherein said processor/memory module is capable of uploading field installable application software including software for age verification applications.

10. The magnetic stripe reader according to claim 1, wherein said means for reading and decoding data on a magnetic stripe have the capability of verifying the authenticity of the magnetic stripe data before sending the magnetic stripe data to the PDA.

11. The magnetic stripe reader according to claim 1, wherein said means for reading and decoding data on a magnetic stripe are capable of encrypting and storing the data exchanged with the PDA prior to forwarding said data to a processing agency without being readable by a PDA operator.

12. The magnetic stripe reader according to claim 11, further comprising the capability to encode the data exchanged with the PDA with a security signature derived from the magnetic stripe data.

13. The magnetic stripe reader according to claim 1, further comprising a wireless personal identification number pad ("PIN pad"), thereby enabling a user to enter a personal identification number to complete a transaction.

14. The magnetic stripe reader according to claim 13, wherein the magnetic stripe reader prevents the transmission of the personal identification number from the PIN pad to the PDA.

15. The magnetic stripe reader according to claim 1, wherein the means for reading and decoding data on a magnetic stripe operate with a maximum power consumption of 2 mA while reading and decoding data, and of 300 $\mu$A in an idle state.

16. The magnetic stripe reader according to claim 1, wherein the MSR is enclosed in a housing shaped like a cradle that retains at least a portion of the PDA.

17. The magnetic stripe reader according to claim 16, wherein the PDA is equipped with detachable PDA cradle creating a hot sync connection between the PDA and a personal computer, wherein the MSR housing is shaped to fit between the PDA and the PDA cradle, and wherein the MSR housing comprises a first connector connected to the PDA synchronization port and a second connector connected to the PDA cradle, the first and second connectors enabling the hot sync connection of the PDA with the personal computer through the magnetic stripe reader.

18. The magnetic stripe reader according to claim 16, wherein the PIN pad is an integral part of said housing.

19. A method for making a magnetic stripe reader ("MSR") attachable to a personal digital assistant ("PDA"), the PDA having a synchronization port and hot sync capabilities, the method comprising the steps of:
(a) providing means for reading and decoding data on a magnetic stripe;
(b) providing means for transferring electric power from the PDA to the MSR and for exchanging data between the MSR and the PDA through the PDA synchronization port;
(c) providing means for managing electrical power consumption that control an automatic startup of the PDA and of the means for reading and decoding data on a magnetic stripe upon detecting encoded data on the magnetic stripe;
(d) providing attachment means for firmly securing said means for reading and decoding data on a magnetic stripe to the PDA; and
(e) providing a connector to enable electrical and data communication between said magnetic stripe reader and the PDA connected thereto.

20. The method for making a magnetic stripe reader according to claim 19, wherein said step of providing means for reading and decoding data on a magnetic stripe further includes the step of providing means for reading and decoding data on a magnetic stripe having a removable processor/memory module.

21. The method for making a magnetic stripe reader according to claim 20, wherein said step of providing means for reading and decoding data on a magnetic stripe further includes the step of providing a removable programmable processor/memory module capable of storing multiple data format specifications and of converting varied magnetic stripe data formats into a standardized single format for data logging and outputting to the PDA.

22. The method for making a magnetic stripe reader according to claim 21, wherein said processor/memory module is capable of preventing transmission to the PDA of predetermined types of data encoded on a magnetic stripe.

23. The method for making a magnetic stripe reader according to claim 19, wherein said step of providing means for reading and decoding data on a magnetic stripe further includes the step of providing a processor/memory module capable of uploading field installable application software including software for age verification applications.

24. The method for making a magnetic stripe reader according to claim 19, wherein said step of providing means for reading and decoding data on a magnetic stripe further includes the step of providing the means for reading and decoding data on a magnetic stripe having the capability of verifying the authenticity of the magnetic stripe data before sending the magnetic stripe data to the PDA.

25. The method for making a magnetic stripe reader according to claim 19, wherein said step of providing means for reading and decoding data on a magnetic stripe further includes the step of providing the means for reading and decoding data on a magnetic stripe with the capability of encrypting and storing the data exchanged with the PDA prior to forwarding said data to a processing agency without being readable by a PDA operator.

26. The method for making a magnetic stripe reader according to claim 19, wherein said step of providing a means for reading and decoding data on a magnetic stripe further includes the step of providing the means for reading and decoding a magnetic stripe with the capability to encode the data exchanged with the PDA with a security signature derived from the magnetic stripe data.

27. The method for making a magnetic stripe reader according to claim 19, further including the step of providing a wireless personal identification number pad ("PIN pad"), thereby enabling a user to enter a personal identification number to complete a transaction.

28. The method for making a magnetic stripe reader according to claim 19, wherein said step of providing means for managing electrical power consumption comprise the additional step of proving the means for managing electrical power with the capability of triggering an automatic startup of the PDA upon detecting encoded data on the magnetic stripe by simulation a hot sync of the PDA.

29. The method for making a magnetic stripe reader according to claim 28, wherein said automatic startup of the PDA upon detecting encoded data on the magnetic stripe is accomplished by replacing the PDA's hot sync driver with a driver that differentiates between the hot sync and said means for reading and decoding data on a magnetic stripe, and thereby said driver sets the PDA to operate accordingly.

* * * * *